Patented Jan. 23, 1951

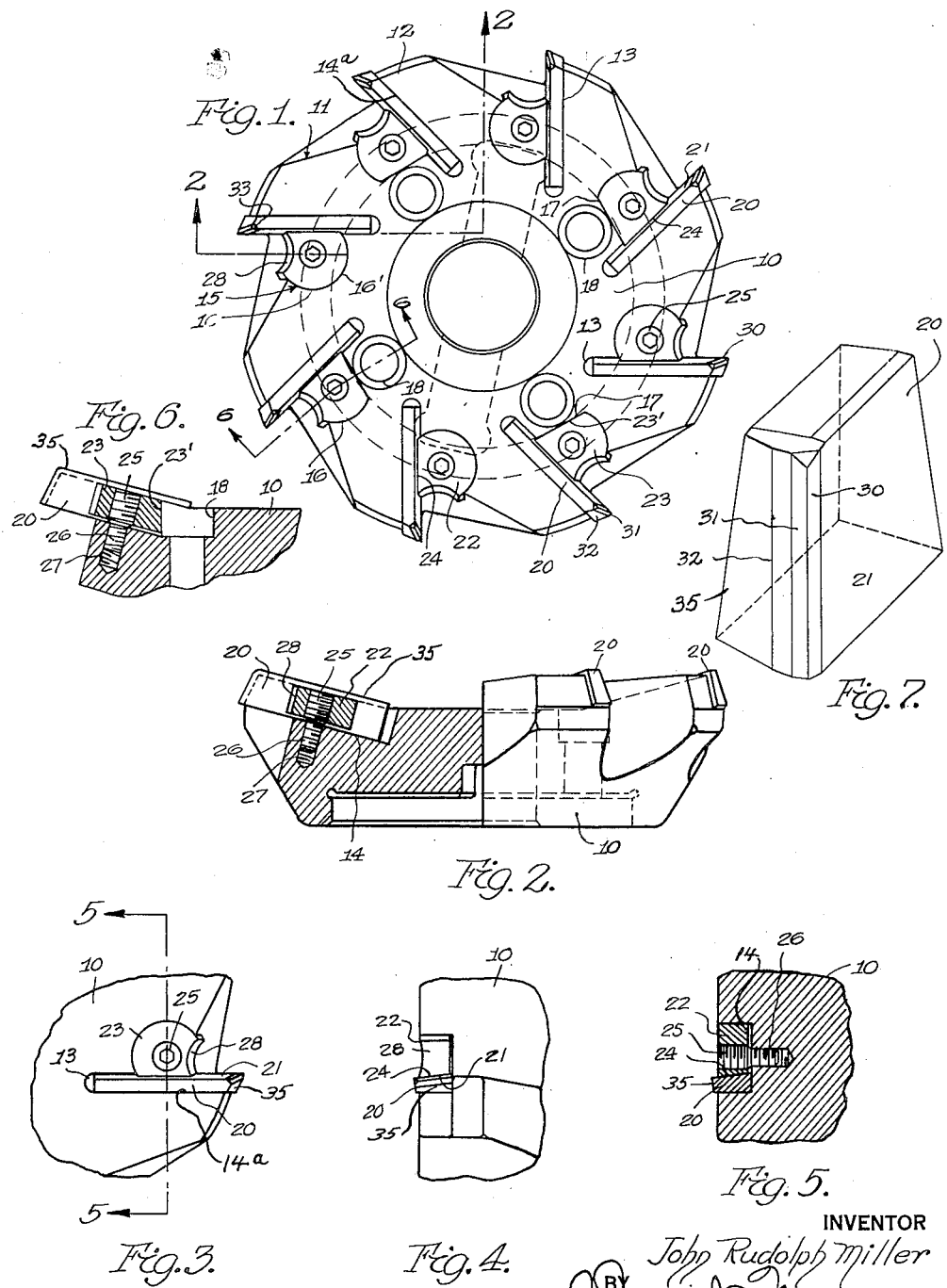

2,538,909

UNITED STATES PATENT OFFICE 2,538,909

CUTTER

John Rudolph Miller, Chicago, Ill., assignor to Beaver Tool & Engineering Corp., Big Beaver, Mich., a corporation of Michigan Application June 22, 1945, Serial No. 600,978

9 Claims. (Cl. 29—105)

The present invention pertains to a novel means for securing an inserted part in a body, such as a blade in a cutter body, by mechanical means as distinguished from brazing or other methods where heat is applied.

Without limitation thereto, the invention is herein disclosed in connection with a milling cutter. It is customary to secure tungsten carbide blades in the body of such a cutter by brazing. The provision of a mechanical means for this purpose, as indicated above, is the primary object of this invention. In connection therewith, a further important object of the invention is to provide a locking wedge which automatically bears uniformly on the blade in a longitudinal direction thereof, while urging the blade with a positive force towards the bottom and back walls of the blade receiving slot. The invention also includes a screw for clamping and locking the wedge and incorporating in its construction and design not only a tighter clamping action, but also a self-locking action for the screw itself.

Another object of the invention is to construct the wedge in a manner to control the chip flow during the cutting operation. This object is accomplished generally by a particular curvature in the wedge which will presently be described in detail. The wedge is preferably provided with a wear-resistant surface where engaged by the chips, although the wedge may readily be replaced if worn or marred. In this connection, the invention also provides a unique mounting and design of the cutter blades for a highly efficient chip flow and yet having adequate strength for cutting hard metals. More specifically in this regard, the blades are set in the cutter at a high positive basic radial angle or rake which is conducive to efficient chip flow. Such an angle, however, is better suited for soft metals than for hard metals. Provision for cutting hard metals is accomplished, without altering the basic angle, by forming the cutting edge of the blade at the outer end of a small land which is inclined rearwardly from the leading face of the blade at an angle which may readily be varied depending upon the physical characteristics of the metal to be cut.

The clearance angle on the peripheral face of the blade lies behind the last named angle. The relation between the basic angle, the small inclined land and the clearance angle is such that only the small land needs to be ground while the basic and clearance angles need not be re-ground each time the blade is re-sharpened. This result is another important object of the invention.

Still another object of the invention is to provide a cutter assembly that is suitable for both soft and hard metals. As already indicated, the blade is set at a basic rake angle having a high positive value and suitable more especially for the softer metals. Without altering this angle, the blade may readily be adapted for cutting harder metals by forming its cutting edge at the outer end of a small land ground at an angle to the leading face of the blade, which angle is less positive than the said basic angle and is varied according to the hardness of the metal to be cut.

The above and other objects of the invention will appear more fully from the more detailed description and by reference to the accompanying drawings forming a part thereof and wherein:

Fig. 1 is a side elevation of a cutter constructed and assembled according to the invention;

Fig. 2 is a section on the line 2—2 of Fig. 1;

Fig. 3 is a detail elevation;

Fig. 4 is a detail edge elevation of the cutter body;

Fig. 5 is a section on the line 5—5 of Fig. 3;

Fig. 6 is a detail section on the line 6—6 of Fig. 1, and

Fig. 7 is a perspective view of the blade.

Reference to these views will now be made by use of like characters which are employed to designate corresponding parts throughout.

In Figs. 1 and 2 is shown a cutter body 10 having the usual peripheral notches 11 forming saw teeth or backing shoulders 12 against which the inserted cutter blades are to be set. At the trailing end of each notch 11, or at the leading side of each saw tooth 12 is formed a machined blade slot 13 extending generally towards the axis of rotation, but at such an angle to a radial plane so that a cutter blade 20 inserted therein will lie at an extreme positive basic radial angle or rake angle, suitable for cutting the softer materials.

The slots 13 extend only partially through the thickness of the body 10 so that each slot has a bottom wall 14, as may be seen more clearly in Fig. 2, and a back wall 14—a formed on the front face of the backing shoulders 12 (see Figs. 1 and 3). Each notch 11 is extended from its bottom, or radially inward, in the form of a pocket 15 having an arcuate wall 16 opposite the adjacent blade slot. Alternate pockets have the arcuate wall 16 continued at 16' as far as the corresponding blade slot 13. The remaining or intervening pockets are formed with a straight inner wall 17 extending from the arcuate wall 16 to the blade slot, in order to clear the countersunk bolt holes 18.

In each of the slots 13 is inserted a cutter blade 20 backed against the adjacent or backing shoulder 12 and projecting somewhat beyond the periphery of the cutter body, as well known in the art. The longitudinal forward face 21 of each blade, or the side facing towards a notch 11 is a wedge surface that slopes from the bottom 14 of the slot 13 outwardly towards the forward face of the cutter and is also inclined towards the back wall 14—a of the slot 13.

Each of the pockets 15 receives a locking wedge for the adjacent blade. The wedges 22, 23 for the two shapes of pockets are obviously formed to fit neatly but rotatably in the respective pockets. Each wedge is formed with a plane and sloped wedging surface 24, which as shown best in Fig. 5, is parallel with the wedging forward face 21 of the cooperating blade 20 and with which it has a considerable area of surface engagement extending longitudinally of the blade surface 21 substantially midway between the inner and outer edges thereof. As will be seen from Figs. 1 and 3 the chord length of this area relative to the cylindrical outline of a wedge is such as to subtend an angle of at least 90°. An automatic burning of the wedges in their respective pockets and a self-adjustment thereof to exert a uniform clamping action on the cutting blades longitudinally thereof when the wedge screws are tightened is thereby insured.

The means for tightening the wedges consists of a differential screw having a portion 25 of larger diameter threaded in the wedge and a portion 26 of smaller diameter adapted to be received in a tapped hole 27 extending into the body 10 from the extended bottom wall 14 of each blade slot 13. The thread on the portion 25 is of the same hand as, but has a finer pitch than, the thread on the portion 26. As the screw is turned into the body 10, the wedge is forced against the adjacent blade at a high mechanical advantage, corresponding to that of a thread of extremely small pitch, due to the action of the differential screw.

The wedge 22 for the form of pocket having a straight wall 17 is formed with a straight bevelled edge 23', and the wall 17 is undercut to clear the bevelled edge 23'. Both the edge 23' and the wall 17 are thus caused to lie parallel to the axis of the hole 18, due to the dished configuration of the body 10.

That surface of each wedge 22, 23 which faces towards the periphery of the body 10 is concaved as at 28 between the edge portions 16 and 24 on the outer side of the screw hole. Due to the outsloping relation of the bottom wall 14 to the axis of the body 10 the surface 28 slopes laterally outward from the body and toward the projected axis.

The high positive radial or rake angle of the blade 20 is favorable for urging the chips away from the work and towards the center of the cutter and the curved face 28 of the wedge. In order to prevent the chips from piling up and jamming in the notches 11 in advance of the forward cutting faces 21, the concave edges 28 of the wedges in addition to being curved are inclined towards the front face of the cutter body at a negative helix angle. The faces of the notches 11 likewise extend at a negative helix angle so as to divert or direct the chips outwardly from the work in a direction longitudinally of the axis of rotation of the cutter and thereby make the cutter self-clearing as to the chips which it removes from the workpiece. The edges 28 may be hardened or the wedges may consist entirely of wear-resistant material in order not to deteriorate rapidly under the impact of the chips. However, when a wedge becomes seriously battered, it is easily replaceable by the means already described.

The high positive rake angle of the blades is of course established by the angle at which the slots 13 are cut in the body 10 and is therefore fixed. As shown, this angle is of the order of 35° which was selected as most conducive for chip disposal as well as being extreme for most materials to be cut. As the rake angle for most materials, especially metals, must be much smaller than 35° the blades 20 may readily be adapted for the cutting of various materials by grinding a narrow land 30 rearwardly inclined at a negative angle to the leading face 21 of the blade and terminating in a peripheral cutting edge. The angle of the land 30 is determined by the effective rake angle best suited for the physical characteristics of the material to be cut. In the constructional example illustrated, the angle of the land 30 is minus 15° to the leading face 21 of the blade and as the latter lies at the basic plus 35° angle the effective rake angle is therefore plus 20°. In addition to varying the rake angle to accommodate the cutter to the different materials to be cut, slight changes in the inclination of such angle will effect a marked change in the direction at which the chips flow away from the cutting edge. Behind the land 30 are the clearance angle surfaces 31, 32. As the blades are fitted neatly within the slots 13, they are thus maintained at an extreme positive basic radial angle favorable for efficient chip flow, while the provision of the land 30 at the cutting edge of each blade with a less positive angle eliminates the presence of a thin section at the cutting edge thus giving greater strength for cutting harder metals and preventing overheating of the cutting edges.

It is also evident that the original grinding and the regrinding of the last named rake angle does not interfere with the clearance angles. The usual side lands or lateral clearances 33 are provided at the extremities of the cutting edge.

It is to be noted that the peripheral cutting face 35 of each blade is sharply beveled or inclined to the horizontal plane or a plane transverse to the axis of rotation of the cutter. This angle is governed in part by the angle at which the slot 13 is machined into the cutter body which, as shown in Figs. 2 and 6 of the drawing, preferably extends at 15° to said plane. The outer peripheral faces 35 of the blades are ground at a slight angle to a perpendicular to the face 21 of the blade for example at an angle of 8° thereto which added to the 15° inclination of the blades gives the blades an effective bevel angle of 23°. As a result of such angle when the blades 20 are reinserted in the slots after regrinding and are recurrently positioned with their bottom faces farther from the bottoms of the slots 13, the original relationship between the extent to which the effective part of the facial cutting edge projects from the cutter body and the O. D. of the cutter is not materially altered. The 15° angle of inclination of the facial cutting edge is also highly important from the standpoint of providing the face of the cutter with a relatively deeply dished recess adjacent the axis of rotation thus providing a large chip clearance space that effectively prevents jamming of chips in the spaces between the facial cutting teeth which is a highly objectionable feature of milling cutters of standard design and which materially reduces the effectiveness of such cutters.

The basic features of the present invention are shown as embodied in a metal working milling cutter of the type known as a face mill of the type widely used in machine shop practice for roughing cuts. When used with carbide tip blades, it has been demonstrated in practice that a cutter constructed in accordance with the principles of the present invention will take cuts of substantial depths in relatively hard, tough steels for long periods of time at incredibly high cutting speeds and as high as the rate of five hundred (500) feet per minute. Such high speed could not be attained were it not for the fact that the effective peripheral cutting edge of the blade is formed at the edge of the small land 30 that extends at a negative angle to the front face 21 of the cutter which extends at such a high positive rake angle. The negative angle land 30 insures a sufficient thickness of material at the cutting edges of the blades for heat conductivity and eliminates the use of thin knife-like edges that would quickly become overheated, chipped and burned out by heavy cuts at such high speeds. In addition, the high positive angle of the front or leading face 21 of the blade, which makes the use of the negative land possible, also contributes materially to the high efficiency of the tool because of the rapidity with which it directs the highly heated chips away from the cutting edges. This, together with the use of the hardened steel wedges having the laterally and longitudinally concavely curved faces 28 on to which the hot chips are directed by the leading face of the blades and which curved wedge faces in turn direct the chips outwardly and prevent packing of them, also contributes materially to the tool's high efficiency.

Although the cutter of the present invention is primarily designed for use with carbide tungsten cutting blades, it will, of course, be understood that such blades may be made of high grade tool steel or any other suitable material depending upon the physical characteristics of the workpiece to be cut.

The assembly of the cutter is as follows:

The blades 20 are placed into the machined slots 13. The portion 25 of the differential screws are screwed part way into wedges 22 and 23 until the smaller end 26 of the screws project from that side of the wedges which seats against the bottom of the wedge pockets in body 10. Wedges 22 and 23 with the screws in place are next placed in the cutter body 1 with angular side of wedges next to angular side of blades 20. The screws are next screwed into the cutter body while wedges 22 and 23 are prevented from turning by contact with blades 20. As the screws are turned clockwise (if right hand threads are used on the screws), the wedges 22 and 23 are pulled closer to the body 10, because the differential action of the threads of different pitches on the screws cause the screws to advance more rapidly into the threaded hole in body 10 than they advance in the wedges.

The angle on wedges 22 and 23 contacts the angle on blades 20, forcing blades 20 tightly into the blade pocket in body 10 as the wedges are drawn closer to the bottom of the wedge pockets. As the wedges are drawn up solid between blades 10 and the curved wedge pockets in body 10, by the coarser threads of the portions 26 of the screws, further tightening of the screws causes the finer threads of the portions 25 to become effective thus due to the differential action locking the screws, wedges and blades firmly and preventing them from loosening due to vibration.

The blades 20 may be ground before assembling into body 10 and then set true with an indicator or may be assembled into body 10 and then finish-ground in place.

While I have shown a satisfactory constructional example of the present invention, it will be understood that many changes, variations and modifications of the specific constructional details may be resorted to without departing from the spirit of the appended claims.

I claim:

1. A milling cutter for cutting metals having a body and a plurality of cutting blades inserted in said body, each of said blades having a peripheral cutting edge and a replaceable wedge having a hardened wear-resistant curved surface extending laterally away from the front cutting face of its respective blade and curving outwardly towards the effective peripheral cutting zone of said cutter and said surface also being inclined at a negative helix angle to the axis of rotation of said cutter.

2. A milling cutter for cutting metals comprising, a body having a slot therein extending at a negative helix angle to the axis of rotation of said cutter and at a large positive radial rake angle to said axis, a cutting blade fitted neatly within said slot, the effective rake angle of said blade being formed by grinding a small land extending at a less positive (which may include negative) angle at the cutting edge of said blade in accordance with the physical characteristics of the metal to be cut.

3. A milling cutter for cutting metals comprising a body having a slot extending inwardly from one edge thereof, said slot having a back wall and a bottom wall, a pocket adjacent to, and communicating with, said slot opposite said back wall, a cutting member inserted in said slot and having a front wall facing said pocket inclined at a wedging angle to both said back and bottom walls, a wedge member in said pocket having a wedge surface parallel to the front wall of said cutting member, and means to move said wedge member towards the bottom of said slot in wedging contact with said cutting member to exert a positive force on said cutting member having components directed towards the back and bottom walls of said slot, said means comprising a differential screw threaded through said wedge member and into said body in parallelism with the back wall of said slot.

4. A milling cutter for cutting metals comprising a body having a slot extending inwardly from one edge thereof, said slot having a back wall and a bottom wall, a pocket adjacent to, and communicating with, said slot opposite said back wall having an arcuate wall opposed to and facing said slot, a cutting member inserted in said slot and having a front wall facing said pocket inclined at a wedging angle to both said back and bottom walls, a wedge member rotatably mounted in said pocket having a wedge surface parallel to the front wall of said cutting member and of a contact length longitudinally of said blade at least as long as a chord that subtends an arc of 90° struck from the center of rotation of said wedge, and means to move said wedge member towards the bottom of said slot in wedging contact with said cutting member to exert a positive force on said cutting member having components directed towards the back and bottom walls of said slot, said means comprising a differential screw threaded through said wedge member and into said body in parallelism with the back wall of said slot.

5. A milling cutter for cutting metals having a body and a plurality of peripheral edged cutting blades detachably secured therein, a clamping wedge for each blade having a hardened wear-resistant curved chip directing surface facing the peripheral cutting edge of said blade and extending laterally away from the front cutting face thereof, said curved surface also being inclined to the axis of rotation of said cutter at a negative helix angle, and a differential screw for clamping said wedge to said body and locking it securely against its respective cutting blade.

6. A milling cutter for cutting metals comprising a body having a slot therein extending at an extreme positive radial rake angle larger than required, a cutting blade having a peripheral cutting edge fitted neatly within said slot and having an effective rake angle established by a narrow land extending radially inward from said peripheral cutting edge at a negative angle to the forward or leading face of said cutting blade, the angle of inclination of said land being determined by the physical characteristics of the metal to be cut.

7. A milling cutter for cutting metals, comprising a body, a cutting blade detachably mounted therein at a large positive rake angle to the radius of said body, said positive rake angle being of the order commonly employed for cutting soft materials, said cutting blade projecting beyond the periphery of said body and having a cutting edge formed thereon by a narrow land inclined inwardly from said edge at a rake angle less positive than the first-named angle, the leading face of said cutting blade forming a chip-clearance angle extending from said cutting edge toward the center of the cutter extending at said large positive rake angle, and the angle of inclination of said narrow land being adapted to be varied in accordance with the physical characteristics of the material to be cut thereby to establish an effective rake angle for said blade best suited for such material.

8. In a face milling cutter for cutting metals, the combination of a substantially cylindrical body having a plurality of slots open to the periphery and one face of said body and having a back wall extending inwardly from said periphery at a large positive rake angle greater than requisite, a cutting blade detachably mounted within each of said slots and having cutting edges projecting beyond said periphery and said face of said body, the peripheral cutting edge of said blade being formed at the forward edge of a narrow land extending at a rake angle less positive than said first-named angle by an amount determined by the physical characteristics of the material to be cut to provide said peripheral end with an effective rake angle best suited for such material, said body being provided with a substantially cylindrical pocket adjacent to and communicating with the leading side of each of said slots, and a replaceable, hardened, wear-resistant wedge member in each of said pockets having a concavely curved chip-directing surface located radially inward of the peripheral end of said cutting blade and extending at a negative helix angle to the axis of rotation of said cutter to direct chips from said cutting edge axially and radially outward of said body.

9. In a face milling cutter for cutting metals, the combination of a substantially cylindrical body having a plurality of slots open to the periphery and one face of said body and having a back wall extending inwardly from said periphery at a large positive rake angle greater than requisite, a cutting blade detachably mounted within each of said slots and having cutting edges projecting beyond said periphery and said face of said body, the peripheral cutting edge of said blade being formed at the forward edge of a narrow land by an amount determined by the physical characteristics of the material to be cut to provide said peripheral end with an effective rake angle best suited for such material, said body being provided with a substantially cylindrical pocket adjacent to and communicating with the leading side of each of said slots, and a replaceable, hardened, wear-resistant wedge member in each of said pockets having a concavely curved chip-directing surface located radially inward of the peripheral end of said cutting blade and extending at a negative helix angle to the axis of rotation of said cutter to direct chips from said cutting edge axiallly and radially outward of said body, and a differential screw for forcing said wedge member against said blade and locking it in wedged position within said slot.

JOHN RUDOLPH MILLER.

REFERENCES CITED

The following references are of record in the file of this patent:

UNITED STATES PATENTS

| Number | Name | Date |
| --- | --- | --- |
| 943,540 | Harrold | Dec. 4, 1909 |
| 978,414 | Vivarttas | Dec. 13, 1910 |
| 1,143,449 | Shimer | June 15, 1915 |
| 2,096,472 | Schmidt | Oct. 19, 1937 |
| 2,136,953 | Reaney | Nov. 15, 1938 |
| 2,150,286 | Miller | Mar. 14, 1939 |
| 2,186,417 | Kraus | Jan. 9, 1940 |

FOREIGN PATENTS

| Number | Country | Date |
| --- | --- | --- |
| 445,825 | Great Britain | Apr. 20, 1936 |